(12) United States Patent
Sagum

(10) Patent No.: US 12,368,650 B2
(45) Date of Patent: Jul. 22, 2025

(54) METHOD AND SYSTEM FOR PROVIDING TELEMETRY MODELING

(71) Applicant: JPMorgan Chase Bank, N.A., New York, NY (US)

(72) Inventor: Ramil Sagum, Jersey City, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 250 days.

(21) Appl. No.: 18/112,320

(22) Filed: Feb. 21, 2023

(65) Prior Publication Data

US 2024/0283711 A1 Aug. 22, 2024

(51) Int. Cl.
*H04L 41/22* (2022.01)
*H04L 41/14* (2022.01)
*H04L 43/045* (2022.01)

(52) U.S. Cl.
CPC ............ *H04L 41/22* (2013.01); *H04L 41/145* (2013.01); *H04L 43/045* (2013.01)

(58) Field of Classification Search
CPC ...... H04L 41/22; H04L 41/145; H04L 43/045
See application file for complete search history.

(56) References Cited

U.S. PATENT DOCUMENTS

| | | | |
|---|---|---|---|
| 9,424,669 B1* | 8/2016 | Lu | H04L 43/045 |
| 11,296,926 B1* | 4/2022 | Henderson | H04L 41/22 |
| 2015/0310362 A1* | 10/2015 | Huffman | G06Q 10/0633 |
| | | | 705/2 |
| 2016/0379148 A1* | 12/2016 | Brown | G06Q 10/06316 |
| | | | 705/7.26 |
| 2018/0122111 A1* | 5/2018 | Silva | G06F 16/26 |
| 2019/0266544 A1* | 8/2019 | Mandala | H04L 41/22 |
| 2020/0097880 A1* | 3/2020 | Agarwal | G06F 9/451 |
| 2021/0226865 A1* | 7/2021 | Gupta | H04L 43/045 |
| 2022/0070065 A1* | 3/2022 | Finn, II | H04L 43/045 |

* cited by examiner

*Primary Examiner* — Nam T Tran
(74) *Attorney, Agent, or Firm* — GREENBLUM & BERNSTEIN, P.L.C.

(57) ABSTRACT

A method for providing telemetry modeling to facilitate workflow visualization is disclosed. The method includes detecting, from a data stream, an initiation of a workflow on a platform; aggregating platform data to generate an initial operating state of the platform; persisting, in a repository, the initial operating state together with an identifier that is associated with the workflow; capturing, via a graphical user interface, telemetry data that corresponds to the workflow, the telemetry data including user telemetry data and associated platform telemetry data; distilling the telemetry data to generate data sets, the data sets representing change events in the workflow; and persisting, in the repository, the data sets together with the initial operating state.

18 Claims, 5 Drawing Sheets

METHOD AND SYSTEM FOR PROVIDING TELEMETRY MODELING

BACKGROUND

1. Field of the Disclosure

This technology generally relates to methods and systems for modeling telemetry, and more particularly to methods and systems for providing telemetry modeling to facilitate workflow visualizations that are usable to replay workflow perturbations at any point in time.

2. Background Information

Many business entities utilize digital workflows such as, for example, digital workflows for trading applications to provide services for users. Often, the digital workflows are complex and involves a number of actors who are reacting and making changes in real-time. Historically, implementations of conventional workflow analytic techniques have resulted in varying degrees of success with respect to event analysis and workflow visualization.

One drawback of using the conventional workflow analytic techniques is that in many instances, the flow of events that happened in the workflow may not be accurately portrayed or visualized due to the complexity of the workflow as well as the intricacy of the changes and/or perturbations in the flow of events. As a result, support for issues encountered in the workflow may be limited due to the inaccurate portrayal of the flow of events. Additionally, visualization of complex workflows may be extremely resource intensive due to the piecemeal nature of the conventional workflow analytic techniques.

Therefore, there is a need to provide telemetry modeling to facilitate workflow visualizations that are usable to replay workflow changes/perturbations at any point in time.

SUMMARY

The present disclosure, through one or more of its various aspects, embodiments, and/or specific features or sub-components, provides, inter alia, various systems, servers, devices, methods, media, programs, and platforms for providing telemetry modeling to facilitate workflow visualizations that are usable to replay workflow perturbations at any point in time.

According to an aspect of the present disclosure, a method for providing telemetry modeling to facilitate workflow visualization is disclosed. The method is implemented by at least one processor. The method may include detecting, from a data stream, an initiation of a workflow on at least one platform; aggregating platform data to generate an initial operating state of the at least one platform; persisting, in a repository, the initial operating state together with an identifier that is associated with the workflow; capturing, via a graphical user interface, telemetry data that corresponds to the workflow, the telemetry data may include user telemetry data and associated platform telemetry data; distilling the telemetry data to generate at least one data set, the at least one data set may represent at least one change event in the workflow; and persisting, in the repository, the at least one data set together with the initial operating state.

In accordance with an exemplary embodiment, the method may further include receiving at least one request for a visual representation of the at least one change event in the workflow, the at least one request may include the identifier that is associated with the workflow; retrieving, from the repository, the initial operating state and the at least one data set based on the identifier; and generating the visual representation by using the initial operating state together with the at least one data set.

In accordance with an exemplary embodiment, to generate the visual representation, the method may further include modeling a plurality of operating states of the workflow through time by using the initial operating state together with the at least one data set; reconstructing the workflow based on a result of the modeling; and generating the visual representation based on the reconstructed workflow.

In accordance with an exemplary embodiment, the visual representation may relate to a replayable sequence of at least one perturbation that influences the workflow, the at least one perturbation may correspond to the at least one change event and may represent deviations in the workflow.

In accordance with an exemplary embodiment, the user telemetry data may include information that corresponds to at least one interaction between at least one user and the graphical user interface, the at least one interaction may include at least one input from the at least one user that is received by the graphical user interface.

In accordance with an exemplary embodiment, the associated platform telemetry data may include information that corresponds to a current operating state of the at least one platform when the user telemetry data is captured, the information may include at least one from among market information, portfolio information, pricing information, participant information, and instrument information.

In accordance with an exemplary embodiment, to distill the telemetry data, the method may further include parsing the telemetry data into at least one data element; identifying a collection of the at least one data element, the collection may correspond to a minimum set of data that can represent the at least one change event; and generating the at least one data set based on the identified collection of the at least one data element.

In accordance with an exemplary embodiment, the generated at least one data set may be modeled as an operation that updates an existing operating state, the existing operating state may include the initial operating state together with at least one other data set.

In accordance with an exemplary embodiment, the method may further include identifying a user signature that is associated with the at least one change event; and appending the user signature to the generated at least one data set, wherein the user signature may be usable to associate the generated at least one data set to a user.

According to an aspect of the present disclosure, a computing device configured to implement an execution of a method for providing telemetry modeling to facilitate workflow visualization is disclosed. The computing device including a processor; a memory; and a communication interface coupled to each of the processor and the memory, wherein the processor may be configured to detect, from a data stream, an initiation of a workflow on at least one platform; aggregate platform data to generate an initial operating state of the at least one platform; persist, in a repository, the initial operating state together with an identifier that is associated with the workflow; capture, via a graphical user interface, telemetry data that corresponds to the workflow, the telemetry data may include user telemetry data and associated platform telemetry data; distill the telemetry data to generate at least one data set, the at least one data set may represent at least one change event in the workflow; and persist, in the repository, the at least one data set together with the initial operating state.

In accordance with an exemplary embodiment, the processor may be further configured to receive at least one request for a visual representation of the at least one change event in the workflow, the at least one request may include the identifier that is associated with the workflow; retrieve, from the repository, the initial operating state and the at least one data set based on the identifier; and generate the visual representation by using the initial operating state together with the at least one data set.

In accordance with an exemplary embodiment, to generate the visual representation, the processor may be further configured to model a plurality of operating states of the workflow through time by using the initial operating state together with the at least one data set; reconstruct the workflow based on a result of the modeling; and generate the visual representation based on the reconstructed workflow.

In accordance with an exemplary embodiment, the visual representation may relate to a replayable sequence of at least one perturbation that influences the workflow, the at least one perturbation may correspond to the at least one change event and represents deviations in the workflow.

In accordance with an exemplary embodiment, the user telemetry data may include information that corresponds to at least one interaction between at least one user and the graphical user interface, the at least one interaction may include at least one input from the at least one user that is received by the graphical user interface.

In accordance with an exemplary embodiment, the associated platform telemetry data may include information that corresponds to a current operating state of the at least one platform when the user telemetry data is captured, the information may include at least one from among market information, portfolio information, pricing information, participant information, and instrument information.

In accordance with an exemplary embodiment, to distill the telemetry data, the processor may be further configured to parse the telemetry data into at least one data element; identify a collection of the at least one data element, the collection may correspond to a minimum set of data that can represent the at least one change event; and generate the at least one data set based on the identified collection of the at least one data element.

In accordance with an exemplary embodiment, the processor may be further configured to model the generated at least one data set as an operation that updates an existing operating state, the existing operating state may include the initial operating state together with at least one other data set.

In accordance with an exemplary embodiment, the processor may be further configured to identify a user signature that is associated with the at least one change event; and append the user signature to the generated at least one data set, wherein the user signature may be usable to associate the generated at least one data set to a user.

According to an aspect of the present disclosure, a non-transitory computer readable storage medium storing instructions for providing telemetry modeling to facilitate workflow visualization is disclosed. The storage medium including executable code which, when executed by a processor, may cause the processor to detect, from a data stream, an initiation of a workflow on at least one platform; aggregate platform data to generate an initial operating state of the at least one platform; persist, in a repository, the initial operating state together with an identifier that is associated with the workflow; capture, via a graphical user interface, telemetry data that corresponds to the workflow, the telemetry data may include user telemetry data and associated platform telemetry data; distill the telemetry data to generate at least one data set, the at least one data set may represent at least one change event in the workflow; and persist, in the repository, the at least one data set together with the initial operating state.

In accordance with an exemplary embodiment, when executed by the processor, the executable code may further cause the processor to receive at least one request for a visual representation of the at least one change event in the workflow, the at least one request may include the identifier that is associated with the workflow; retrieve, from the repository, the initial operating state and the at least one data set based on the identifier; and generate the visual representation by using the initial operating state together with the at least one data set.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
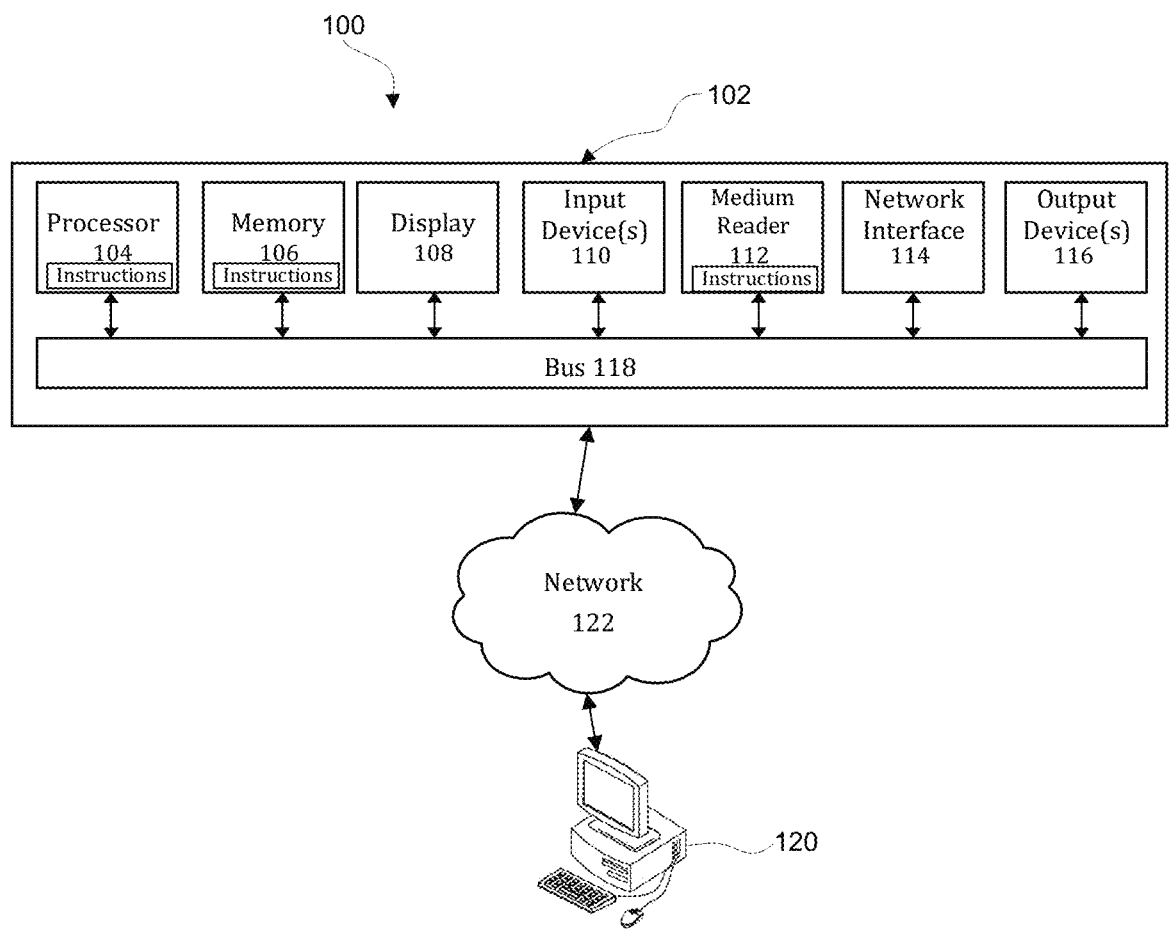
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing telemetry modeling to facilitate workflow visualizations that are usable to replay workflow perturbations at any point in time.

Figure 2:
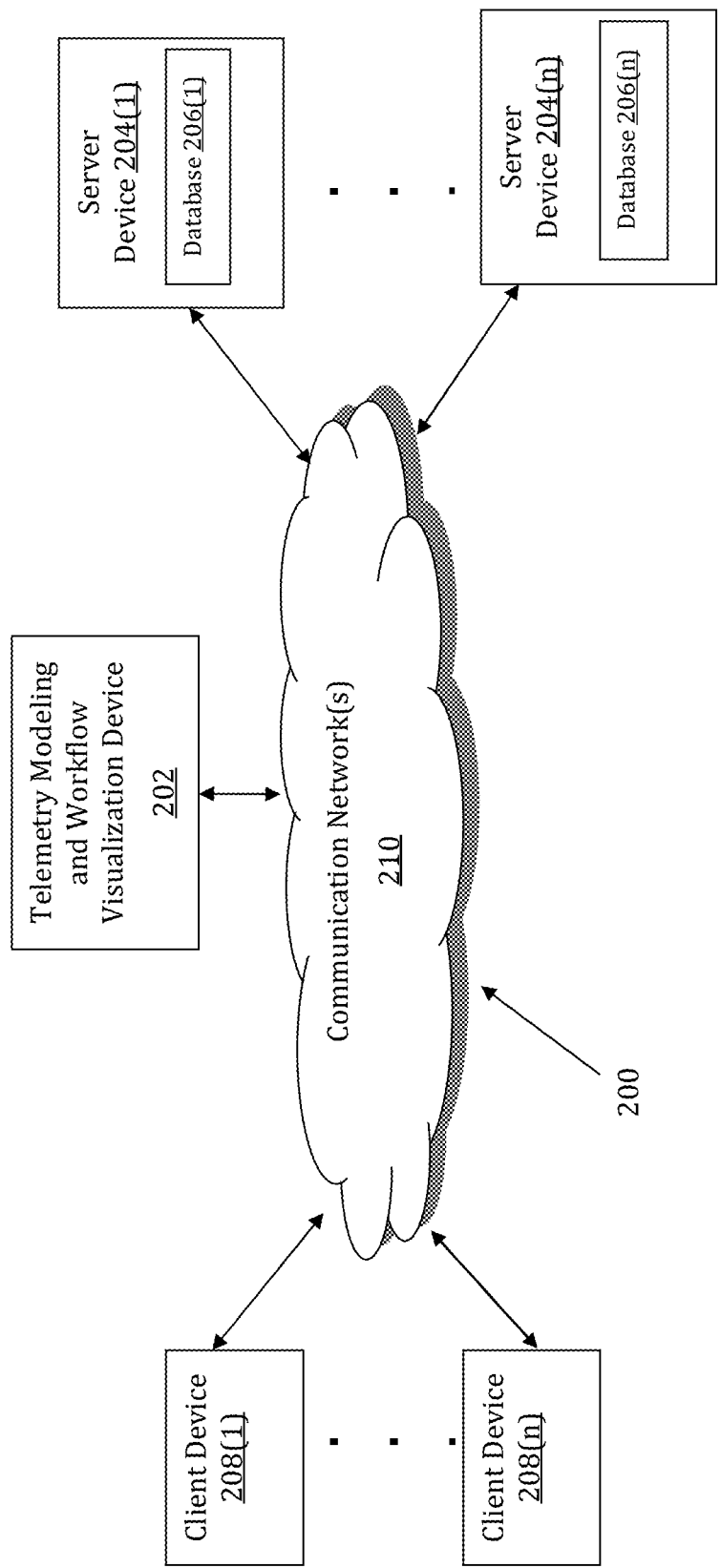
FIG. 2 illustrates an exemplary diagram of a network environment.

Referring to FIG. 2, a schematic of an exemplary network environment 200 for implementing a method for providing telemetry modeling to facilitate workflow visualizations that are usable to replay workflow perturbations at any point in time is illustrated. In an exemplary embodiment, the method is executable on any networked computer platform, such as, for example, a personal computer (PC).

The method for providing telemetry modeling to facilitate workflow visualizations that are usable to replay workflow perturbations at any point in time may be implemented by a Telemetry Modeling and Workflow Visualization (TMWV) device 202. The TMWV device 202 may be the same or similar to the computer system 102 as described with respect to FIG. 1. The TMWV device 202 may store one or more applications that can include executable instructions that, when executed by the TMWV device 202, cause the TMWV device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TMWV device 202 itself, may be located in virtual server(s) running in a cloud-based computing environment rather than being tied to one or more specific physical network computing devices. Also, the application(s) may be running in one or more virtual machines (VMs) executing on the TMWV device 202. Additionally, in one or more embodiments of this technology, virtual machine(s) running on the TMWV device 202 may be managed or supervised by a hypervisor.

In the network environment 200 of FIG. 2, the TMWV device 202 is coupled to a plurality of server devices 204(1)-204(n) that hosts a plurality of databases 206(1)-206(n), and also to a plurality of client devices 208(1)-208(n) via communication network(s) 210. A communication interface of the TMWV device 202, such as the network interface 114 of the computer system 102 of FIG. 1, operatively couples and communicates between the TMWV device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TMWV device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TMWV devices that efficiently implement a method for providing telemetry modeling to facilitate workflow visualizations that are usable to replay workflow perturbations at any point in time.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TMWV device 202 may be a standalone device or integrated with one or more other devices or apparatuses, such as one or more of the server devices 204(1)-204(n), for example. In one particular example, the TMWV device 202 may include or be hosted by one of the server devices 204(1)-204(n), and other arrangements are also possible. Moreover, one or more of the devices of the TMWV device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TMWV device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to workflows, platforms data, initial operating states, identifiers, telemetry data, user telemetry data, platform telemetry data, data sets, change events, requests, and visual representations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TMWV device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TMWV device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TMWV device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TMWV device 202, the server devices 204(1)-204(n), or the client devices 208(1)-208(n), for example, may be configured to operate as virtual instances on the same physical machine. In other words, one or more of the TMWV device 202, the server devices 204(1)-204(n), or the client devices 208(1)-208(n) may operate on the same physical device rather than as separate devices communicating through communication network(s) 210. Additionally, there may be more or fewer TMWV devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
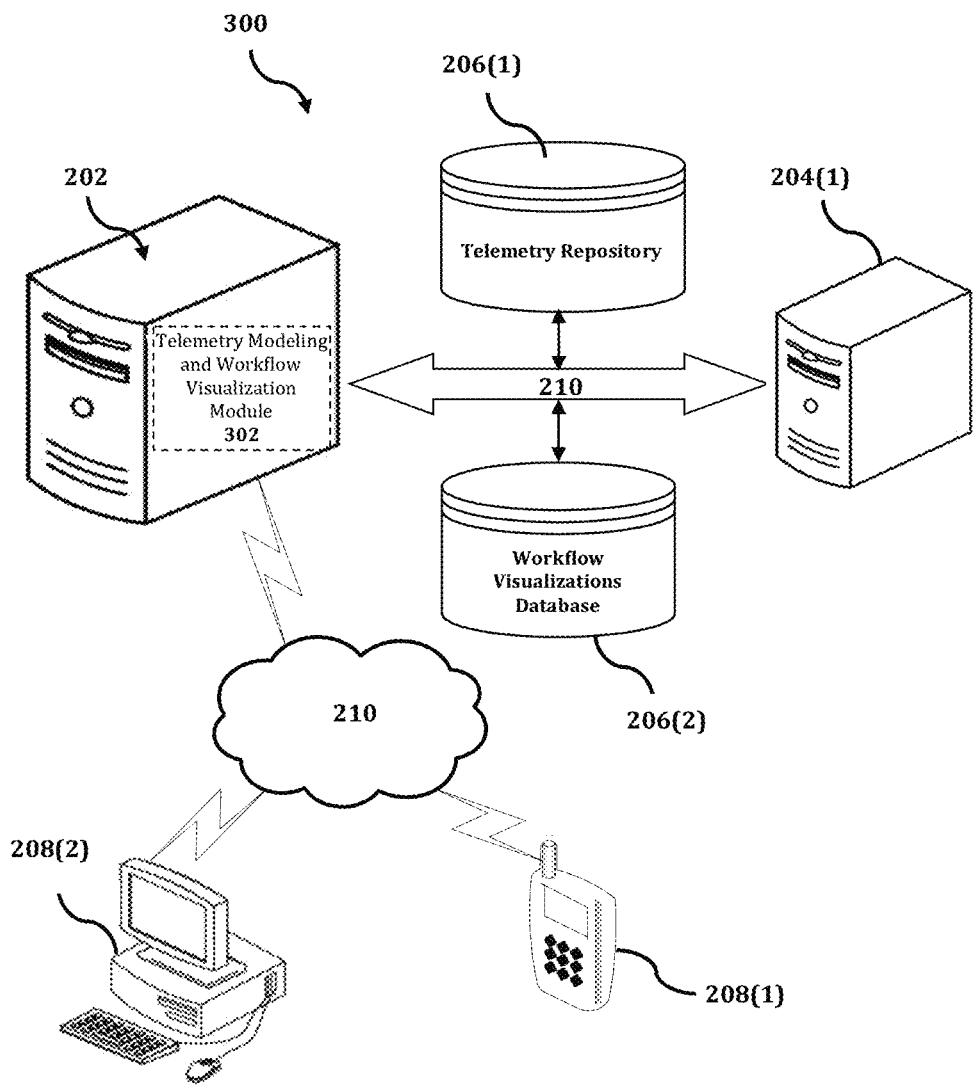
FIG. 3 shows an exemplary system for implementing a method for providing telemetry modeling to facilitate workflow visualizations that are usable to replay workflow perturbations at any point in time.

The TMWV device 202 is described and shown in FIG. 3 as including a telemetry modeling and workflow visualization module 302, although it may include other rules, policies, modules, databases, or applications, for example. As will be described below, the telemetry modeling and workflow visualization module 302 is configured to implement a method for providing telemetry modeling to facilitate workflow visualizations that are usable to replay workflow perturbations at any point in time.

An exemplary process 300 for implementing a mechanism for providing telemetry modeling to facilitate workflow visualizations that are usable to replay workflow perturbations at any point in time by utilizing the network environment of FIG. 2 is shown as being executed in FIG. 3. Specifically, a first client device 208(1) and a second client device 208(2) are illustrated as being in communication with TMWV device 202. In this regard, the first client device 208(1) and the second client device 208(2) may be "clients" of the TMWV device 202 and are described herein as such. Nevertheless, it is to be known and understood that the first client device 208(1) and/or the second client device 208(2) need not necessarily be "clients" of the TMWV device 202, or any entity described in association therewith herein. Any additional or alternative relationship may exist between either or both of the first client device 208(1) and the second client device 208(2) and the TMWV device 202, or no relationship may exist.

Further, TMWV device 202 is illustrated as being able to access a telemetry repository 206(1) and a workflow visualizations database 206(2). The telemetry modeling and workflow visualization module 302 may be configured to access these databases for implementing a method for providing telemetry modeling to facilitate workflow visualizations that are usable to replay workflow perturbations at any point in time.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TMWV device 202 via broadband or cellular communication. Of course, these embodiments are merely exemplary and are not limiting or exhaustive.

Upon being started, the telemetry modeling and workflow visualization module 302 executes a process for providing telemetry modeling to facilitate workflow visualizations that are usable to replay workflow perturbations at any point in time. An exemplary process for providing telemetry modeling to facilitate workflow visualizations that are usable to replay workflow perturbations at any point in time is generally indicated at flowchart 400 in FIG. 4.

Figure 4:
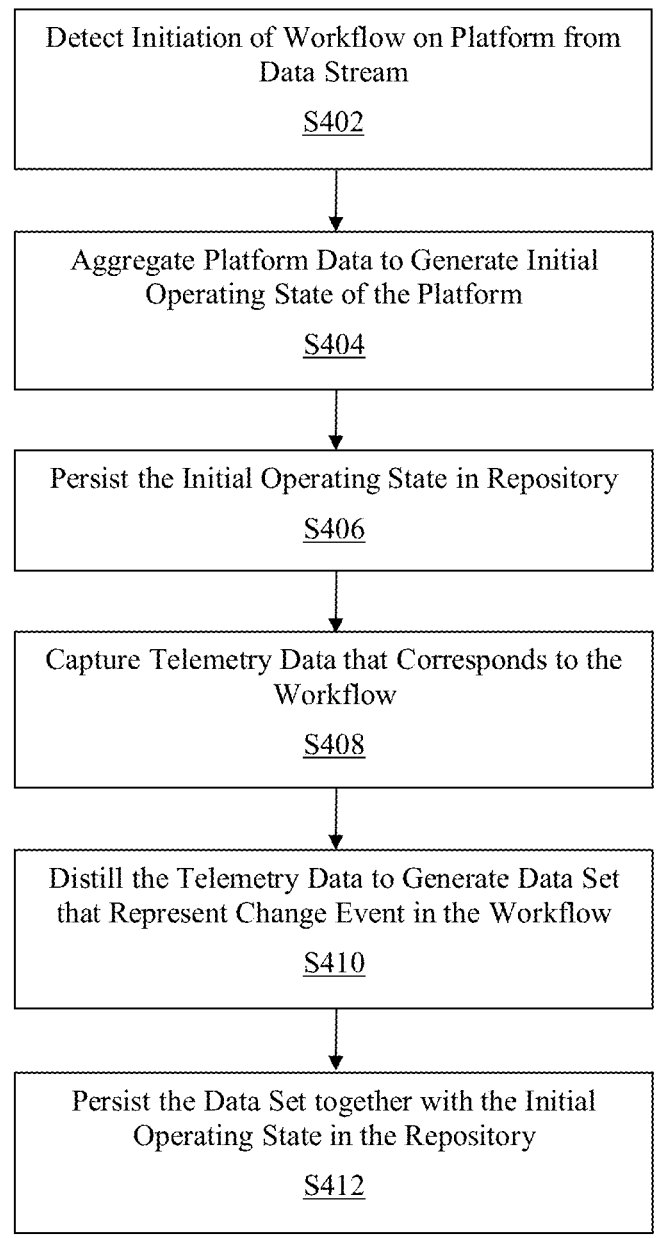
FIG. 4 is a flowchart of an exemplary process for implementing a method for providing telemetry modeling to facilitate workflow visualizations that are usable to replay workflow perturbations at any point in time.

In the process 400 of FIG. 4, at step S402, an initiation of a workflow may be detected on a platform. The initiation may be detected from a data stream of the platform. In an exemplary embodiment, the workflow may correspond to a sequence of processes through which a piece of work passes from initiation to completion. The workflow may include a digital workflow that facilitate the automation of processes via computing devices. The digital workflow may relate to a series of tasks that are carried out by applications to achieve an outcome. For example, digital workflows for trading applications may enable the exchange of various financial instruments via the trading applications.

In another exemplary embodiment, the initiation of the workflow may correspond to an initial starting action that is associated with the workflow. The workflow may be initiated when a first action such as, for example, a first step in the workflow is started. For example, initiating of a digital workflow for trading applications may include submission of a request for quote.

In another exemplary embodiment, the initial starting action that is associated with the workflow may be detected from a data stream of the platform. The data stream of the platform may be accessed consistent with present disclosures to enable the identification of the initial starting action. For example, the data stream may be parsed and searched to identify indicators that relate to the initial starting action. In another exemplary embodiment, the initiation of the workflow may correspond to identification of indicators in the data stream suggesting that the workflow has been started. The indicators may be received as event messages from an upstream application that initiated the workflow.

In another exemplary embodiment, the platform may correspond to an operating environment upon which the applications associated with the workflow may be executed. The platform may serve as a framework for the execution of the associated applications. For example, the platform may include a trading platform for digital workflows of trading applications. In another exemplary embodiment, the platform may include various computing components that facilitate platform functionalities. Consistent with present disclosures, the computing components may include at least one from among hardware components, software components, operating systems, and associated application programming interfaces.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, platform data may be aggregated to generate an initial operating state of the platform. In an exemplary embodiment, the platform data may correspond to quantities, characters, and/or symbols on which operations are performed by a computer. Consistent with present disclosures, the platform data may be stored and transmitted in the form of electrical signals and recorded on magnetic, optical, and/or mechanical recording media.

In another exemplary embodiment, the platform data may include at least one from among operation parameter data and environmental data. The operation parameter data may relate to first-party parameters associated with the function of the platform such as, for example, processing statistics of the platform. The environmental data may relate to third-party data that are usable by the platform. For example, the environmental data for a trading platform may include market data, pricing data, and financial instrument data.

In another exemplary embodiment, the platform data may be aggregated by using any interface such as, for example, an application programming interface (API) that facilitates interactions between two or more computer programs. The platform data may be aggregated in real-time, based on a predetermined schedule, as well as in an ad hoc manner. In another exemplary embodiment, the platform data may be usable to generate a representation of an initial operating state of the platform. The initial operating state of the platform may correspond to a snapshot of the operating state of the platform when the initiation of the workflow is detected. The initial operating state of the platform may relate to a record of the operating state of the platform at a point in time.

At step S406, the initial operating state may be persisted together with an identifier that is associated with the workflow. The initial operating state and the identifier may be persisted in a repository. In an exemplary embodiment, the identifier may correspond to a sequence of characters, numbers, and/or symbols that are usable to identify or refer to the workflow. The identifier may be extracted from a set of data such as, for example, metadata that is associated with the workflow. The identifier may be predetermined for each of a plurality of workflows.

In another exemplary embodiment, the initial operating state may be persisted together with the identifier in a repository. The identifier may be appended to the initial operating state to show that the initial operating state corresponds to initiation of a specified workflow. In another exemplary embodiment, the repository may include a location such as, for example, a telemetry store upon which data may be persisted. Consistent with present disclosures, the repository may include a variety of data storage technologies such as, for example, cloud storage of data in logical pools and on-premises storage of data in a central location.

At step S408, telemetry data that corresponds to the workflow may be captured via a graphical user interface. The telemetry data may include user telemetry data and associated platform telemetry data. In an exemplary embodiment, the telemetry data may correspond to a record of change events in the workflow. The record may include details relating to actions that are performed by actors associated with the workflow. The actors may include users of the platform as well as computing components that may affect the workflow. For example, the computing component may include a pricing engine that dictates trade prices for digital workflows of trading applications. Consistent with present disclosures, the telemetry data may include measurements and statistical data that are associated with any changes and/or perturbations in the workflow. The telemetry data may relate to a snapshot of the changes and/or perturbations in the workflow at a point in time.

In another exemplary embodiment, the user telemetry data may include information that corresponds to interactions between various users and the graphical user interface. The interactions may include inputs from the users that are received by the graphical user interface. In another exemplary embodiment, the user telemetry data may be captured via the graphical user interface that facilitates the interaction. The graphical user interface may log various elements of the interaction such as, for example, user inputs and corresponding data displayed on the graphical user interface. For example, the graphical user interface may log a user input and any corresponding data that is actively displayed for the user to provide a snapshot of the user interaction.

In another exemplary embodiment, the associated platform telemetry data may include information and configurations that correspond to a current operating state of the platform when the user telemetry data is captured. The information may include at least one from among market information, portfolio information, pricing information, participant information, and instrument information. Consistent with present disclosures, the associated platform telemetry data may relate to first-party and third-party data that are in use by the platform when the user telemetry data is captured. For example, the associated platform telemetry data of a trading platform may include market data, pricing data, and financial instrument data.

At step S410, the telemetry data may be distilled to generate data sets. The data sets may represent change events in the workflow. In an exemplary embodiment, the telemetry data may be distilled to reduce the size of the telemetry data set. The distillation process may identify and extract pertinent information from the telemetry data to generate data sets that are smaller in size. By generating corresponding data sets of a smaller size, the telemetry data may be efficiently persisted with minimal computing resources.

In another exemplary embodiment, to facilitate the distilling of the telemetry data, the telemetry data may be parsed into components such as, for example, data elements. The data elements may relate to an atomic unit of the telemetry data that has precise meaning and/or precise semantics. A collection of the data elements may then be identified. The collection of the data elements may correspond to a minimum set of data that can represent each of the change events. Finally, the data sets may be generated based on the identified collection of the data elements. The generated data sets may be modeled as an operation that updates an existing operating state. The existing operating state may include the initial operating state together with other data sets.

As an example, various actions that can be performed by actors may be captured as telemetry data. The telemetry data may then be distilled into the minimum set of data that can represent the changes done in the workflow. The minimum set of data may be modeled as an operation that updates an existing state. By maintaining changes as updates to the existing state, a smaller amount of data is required to represent changes. Given an initial state and the updates, the claimed invention may be able to model all of the states of a specific output of the workflow such as, for example, a specific trading item. That is, the initial state and the updates enable the modeling of all states that the specific trading item went through over time.

In another exemplary embodiment, a user signature that is associated with the change events may be identified. The user signature may correspond to a specific user who is involved with the change events. For example, the user signature may correspond to a trader who initiates a trade based on a received request for quotation. The user signature may include a unique identifier of the specific user such as, for example, an employee number. Then, the user signature may be appended to the generated data set for persistence. The user signature may be usable to associate the generated data set to the specific user. User signatures may be matched to validate workflow records.

In another exemplary embodiment, documentation may be automatically generated for each of the actors who is involved with the workflow. The documentation may include information that relates to the change events as well as actions of the actors involved. The documentation may be generated by using the user signature to identify specific actions of specific actors. Consistent with present disclosures the documentation may correspond to records that provide official information or evidence of the change events as it relates to the workflow.

At step S412, the data sets may be persisted together with the initial operating state. The data sets and the corresponding initial operating state may be persisted in the repository. Consistent with present disclosures, the data sets may be modeled as an operation that updates an existing operating state in the repository. The existing operating state may include the initial operating state as well as any other data sets and updates. For example, the initial operating state together with the changes and/or perturbations may be stored to enable modeling of all the states of the workflow.

In another exemplary embodiment, requests for a visual representation of change events in the workflow may be received. The requests may include the identifier that is associated with the workflow. The visual representation may relate to a replayable sequence of at least one perturbation that influences the workflow. Consistent with present disclosures, the at least one perturbation may correspond to the change events and may represent deviations in the workflow. In response to the requests, the initial operating state and the corresponding data sets may be retrieved from the repository. The retrieval process may be facilitated based on the identifier. Then, the visual representation may be generated by using the initial operating state together with the data sets.

In another exemplary embodiment, to generate the visual representation, a plurality of operating states of the workflow may be modeled. The plurality of operating states may be modeled through time by using the initial operating state together with the data set. Then, the workflow may be reconstructed based on a result of the modeling. Finally, the visual representation may be generated based on the reconstructed workflow.

Figure 5:
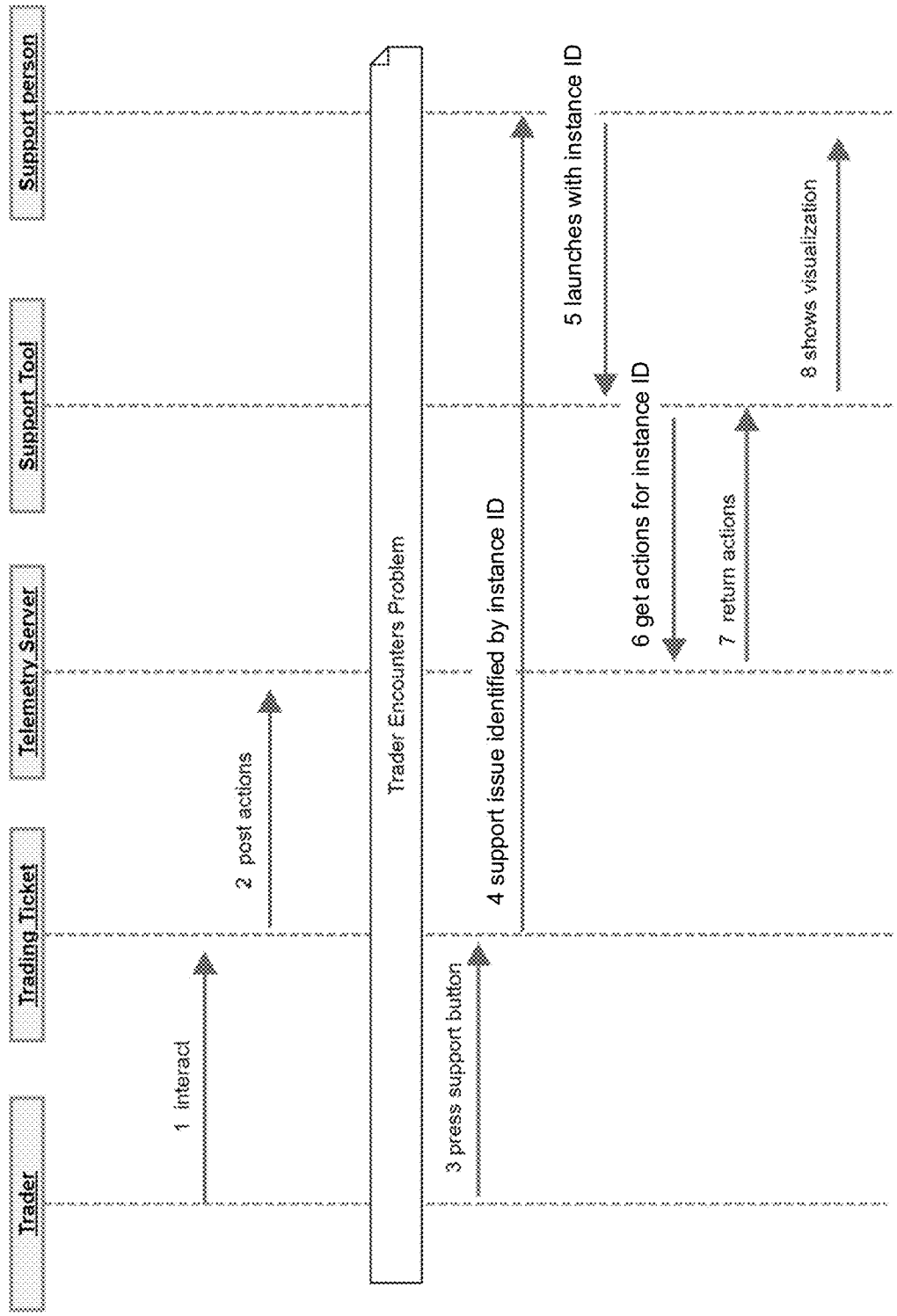
FIG. 5 is a flow diagram of an exemplary process for implementing a method for providing telemetry modeling to facilitate workflow visualizations that are usable to replay workflow perturbations at any point in time.

FIG. 5 is a flow diagram 500 of an exemplary process for implementing a method for providing telemetry modeling to facilitate workflow visualizations that are usable to replay workflow perturbations at any point in time. In FIG. 5, a general workflow is provided for an exemplary implementation of the telemetry modeling and workflow visualization service.

As illustrated in FIG. 5, at step 1, a user such as, for example, a trader may interact with a ticket in a platform such as, for example, a trading platform. The ticket may correspond to a request for quotation ticket that relates to a solicitation for trades of a financial instrument. At step 2, the platform may post actions of the user to a telemetry server. Consistent with present disclosures, the telemetry server may persist information that relates to actions of the user as well as parameters and configurations of the platform. Then, the user may encounter a problem with either the ticket and/or the platform.

At step 3, the user may press a support button that is available on the platform to request assistance. At step 4, the platform may send an identifier such as, for example, an instance identifier to a support service. The identifier may be sent to the support service via a communication interface such as, for example, an email. At step 5, the support service may initiate a support tool such as, for example, a viewer based on the identifier for a visual representation of the corresponding workflow. At step 6, the support tool may retrieve actions that correspond to the identifier from the telemetry server.

At step 7, the telemetry server returns actions that are associated with the identifier to the support tool. Then, at step 8, the support tool models the sequence of actions that influenced the workflow and generates the visual representation for the support service. Consistent with present disclosures, the visual representation may relate to a replayable sequence of changes and perturbations that influence the workflow. The perturbations may correspond to change events and may represent deviations in the workflow. The visual representation of the workflow may enable timely identification of the encountered problem as well as corresponding resolution actions.

Accordingly, with this technology, an optimized process for providing telemetry modeling to facilitate workflow visualizations that are usable to replay workflow perturbations at any point in time is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing telemetry modeling to facilitate workflow visualization, the method being implemented by at least one processor, the method comprising:

detecting, by the at least one processor from a data stream, an initiation of a workflow on at least one platform;

aggregating, by the at least one processor, platform data to generate an initial operating state of the at least one platform;

persisting, by the at least one processor in a repository, the initial operating state together with an identifier that is associated with the workflow;

capturing, by the at least one processor via a graphical user interface, telemetry data that corresponds to the workflow, the telemetry data including user telemetry data and associated platform telemetry data;

distilling, by the at least one processor, the telemetry data to generate at least one data set, the at least one data set representing at least one change event in the workflow; and persisting, by the at least one processor in the repository, the at least one data set together with the initial operating state, wherein the distilling of the telemetry data further comprises:

parsing, by the at least one processor, the telemetry data into at least one data element;

identifying, by the at least one processor, a collection of the at least one data element, the collection corresponding to a minimum set of data that can represent the at least one change event; and generating, by the at least one processor, the at least one data set based on the identified collection of the at least one data element.

2. The method of claim 1, further comprising:

receiving, by the at least one processor, at least one request for a visual representation of the at least one change event in the workflow, the at least one request including the identifier that is associated with the workflow;

retrieving, by the at least one processor from the repository, the initial operating state and the at least one data set based on the identifier; and generating, by the at least one processor, the visual representation by using the initial operating state together with the at least one data set.

3. The method of claim 2, wherein generating the visual representation further comprises:

modeling, by the at least one processor, a plurality of operating states of the workflow through time by using the initial operating state together with the at least one data set;

reconstructing, by the at least one processor, the workflow based on a result of the modeling; and generating, by the at least one processor, the visual representation based on the reconstructed workflow.

4. The method of claim 3, wherein the visual representation relates to a replayable sequence of at least one perturbation that influences the workflow, the at least one perturbation corresponding to the at least one change event and represents deviations in the workflow.

5. The method of claim 1, wherein the user telemetry data includes information that corresponds to at least one interaction between at least one user and the graphical user interface, the at least one interaction including at least one input from the at least one user that is received by the graphical user interface.

6. The method of claim 1, wherein the associated platform telemetry data includes information that corresponds to a current operating state of the at least one platform when the user telemetry data is captured, the information including at least one from among market information, portfolio information, pricing information, and instrument information.

7. The method of claim 1, wherein the generated at least one data set is modeled as an operation that updates an existing operating state, the existing operating state including the initial operating state together with at least one other data set.

8. The method of claim 1, further comprising:
identifying, by the at least one processor, a user signature that is associated with the at least one change event; and
appending, by the at least one processor, the user signature to the generated at least one data set,
wherein the user signature is usable to associate the generated at least one data set to a user.

9. A computing device configured to implement an execution of a method for providing telemetry modeling to facilitate workflow visualization, the computing device comprising:
a processor;
a memory; and
a communication interface coupled to each of the processor and the memory,
wherein the processor is configured to:
detect, from a data stream, an initiation of a workflow on at least one platform;
aggregate platform data to generate an initial operating state of the at least one platform;
persist, in a repository, the initial operating state together with an identifier that is associated with the workflow;
capture, via a graphical user interface, telemetry data that corresponds to the workflow, the telemetry data including user telemetry data and associated platform telemetry data;
distill the telemetry data to generate at least one data set, the at least one data set representing at least one change event in the workflow; and
persist, in the repository, the at least one data set together with the initial operating state,
wherein, to distill the telemetry data, the processor is further configured to:
parse the telemetry data into at least one data element;
identify a collection of the at least one data element, the collection corresponding to a minimum set of data that can represent the at least one change event; and
generate the at least one data set based on the identified collection of the at least one data element.

10. The computing device of claim 9, wherein the processor is further configured to:
receive at least one request for a visual representation of the at least one change event in the workflow, the at least one request including the identifier that is associated with the workflow;
retrieve, from the repository, the initial operating state and the at least one data set based on the identifier; and
generate the visual representation by using the initial operating state together with the at least one data set.

11. The computing device of claim 10, wherein, to generate the visual representation, the processor is further configured to:
model a plurality of operating states of the workflow through time by using the initial operating state together with the at least one data set;
reconstruct the workflow based on a result of the modeling; and
generate the visual representation based on the reconstructed workflow.

12. The computing device of claim 11, wherein the visual representation relates to a replayable sequence of at least one perturbation that influences the workflow, the at least one perturbation corresponding to the at least one change event and represents deviations in the workflow.

13. The computing device of claim 9, wherein the user telemetry data includes information that corresponds to at least one interaction between at least one user and the graphical user interface, the at least one interaction including at least one input from the at least one user that is received by the graphical user interface.

14. The computing device of claim 9, wherein the associated platform telemetry data includes information that corresponds to a current operating state of the at least one platform when the user telemetry data is captured, the information including at least one from among market information, portfolio information, pricing information, and instrument information.

15. The computing device of claim 9, wherein the processor is further configured to model the generated at least one data set as an operation that updates an existing operating state, the existing operating state including the initial operating state together with at least one other data set.

16. The computing device of claim 9, wherein the processor is further configured to:
identify a user signature that is associated with the at least one change event; and
append the user signature to the generated at least one data set,
wherein the user signature is usable to associate the generated at least one data set to a user.

17. A non-transitory computer readable storage medium storing instructions for providing telemetry modeling to facilitate workflow visualization, the storage medium comprising executable code which, when executed by a processor, causes the processor to:
detect, from a data stream, an initiation of a workflow on at least one platform;
aggregate platform data to generate an initial operating state of the at least one platform;
persist, in a repository, the initial operating state together with an identifier that is associated with the workflow;
capture, via a graphical user interface, telemetry data that corresponds to the workflow, the telemetry data including user telemetry data and associated platform telemetry data;
distill the telemetry data to generate at least one data set, the at least one data set representing at least one change event in the workflow; and
persist, in the repository, the at least one data set together with the initial operating state, wherein, when executed by the processor, the executable code further causes the processor to distill the telemetry data by:

parsing the telemetry data into at least one data element;

identifying a collection of the at least one data element, the collection corresponding to a minimum set of data that can represent the at least one change event; and generating the at least one data set based on the identified collection of the at least one data element.

18. The storage medium of claim 17, wherein, when executed by the processor, the executable code further causes the processor to:

receive at least one request for a visual representation of the at least one change event in the workflow, the at least one request including the identifier that is associated with the workflow;

retrieve, from the repository, the initial operating state and the at least one data set based on the identifier; and generate the visual representation by using the initial operating state together with the at least one data set.

* * * * *